(12) United States Patent
van Putte

(10) Patent No.: US 6,338,865 B1
(45) Date of Patent: Jan. 15, 2002

(54) PROCESS FOR PREPARING FOOD PRODUCTS FORTIFIED WITH OLEANOLIC ACID

(75) Inventor: Karel Petrus Agnes Maria van Putte, Vlaardingen (NL)

(73) Assignee: Unilever Patent Holdings BV, Vlaardingen (NL)

( * ) Notice: Subject to any disclaimer, the term of this patent is extended or adjusted under 35 U.S.C. 154(b) by 0 days.

(21) Appl. No.: 09/468,637

(22) Filed: Dec. 22, 1999

(30) Foreign Application Priority Data

Dec. 23, 1998 (EP) .............................. 98204443

(51) Int. Cl.$^7$ .............................. A23D 9/00; C11B 1/10
(52) U.S. Cl. ...................... 426/417; 426/484; 426/485; 426/601
(58) Field of Search ........................ 554/8, 9; 426/417, 426/478, 484, 485

(56) References Cited

U.S. PATENT DOCUMENTS

| | | | |
|---|---|---|---|
| 4,370,274 A | * 1/1983 | Finch | |
| 4,452,744 A | * 6/1984 | Finch | |
| 5,094,871 A | * 3/1992 | Heath | .......................... 426/573 |
| 5,405,633 A | * 4/1995 | Heidlas | .......................... 426/442 |
| 5,714,150 A | 2/1998 | Nachman | .................. 424/195.1 |
| 5,976,595 A | * 11/1999 | Ganguli | ...................... 426/417 |
| 5,998,641 A | * 12/1999 | Ganguli | ...................... 554/212 |
| 6,037,492 A | * 3/2000 | Hierro | .......................... 562/498 |
| 6,111,119 A | * 8/2000 | Trout | .......................... 554/16 |

FOREIGN PATENT DOCUMENTS

| | | |
|---|---|---|
| CA | 2232692 | 2/1998 |
| JP | 01 039973 | 2/1989 |
| WO | 97/32947 | 9/1997 |
| WO | 98/04331 | 2/1998 |

OTHER PUBLICATIONS

Hui 1996 Baileys Industrial Oil and Fat Products 5 th ed. vol. 2 John Wiley & Sons, New York p 247–259.*
Weast 1970 Handbook of Chemistry and Physics 51st edition The Chemical Rubber Co., Ohio p C402 and C236.*
Tutour and Guedon, 1992. Antoxidative Activities of Olea Europaea Leaves and Related Phenolic Compounds. Phytochemistry 31(4)1173–1178.*
Marsilio, V. 1996. Progress in Table Olive Debittering: Degradation in vitro of Oleuropein and Its Derivative by Lactobacillus plantarum. JAOCS 73(5)593–597.*
Di Giovacchino et al, JAOCS., 73(3):371–374 (1996).
Derwent Publications Ltd., Abstract, XP002104606, 1997.
Bianco et al, Food Chemistry, 63(4):461–464 (1998).
Roncero et al, Grasas y Aceites, 20(3):133–138 (1969).
Susnik–Rybarski et al, Hrana I Ishrana—Food Nutrition, 24(1–2):11–15 (1983).

* cited by examiner

Primary Examiner—Carolyn Paden
(74) Attorney, Agent, or Firm—Pillsbury Winthrop LLP

(57) ABSTRACT

Olive oil is fortified with oleanolic acid by including olive leaves in the malaxation mash of conventional olive oil pressing in an amount of 5–50 wt. %, based on the weight of the malaxation mash. The invention comprises vegetable oils fortified with a concentrate of oleanolic acid and, optionally, oleuropein. Food products fortified with oleanolic acid containing oils or concentrates according to the invention are also part of the invention.

14 Claims, 1 Drawing Sheet

Oleanolic Acid

PROCESS FOR PREPARING FOOD PRODUCTS FORTIFIED WITH OLEANOLIC ACID

The present invention relates to a process for preparing food products containing a high level of oleanolic acid, a compound which is derived from leaves of the olive tree. The present invention also relates to the obtained fortified products such as vegetable oils, in particular olive oil, spreads, mayonnaise, salad dressings and sauces.

BACKGROUND OF THE INVENTION

Oleanolic acid (3-beta-hydroxy-28-carboxy-oleanen) belongs to the chemical compound class of the triterpenes. See FIG. 1 for its chemical structure. Olive leaves are a known source of oleanolic acid, containing up to 6.5 wt. %. Oleanolic acid has a low solubility in olive oil and may cause turbidity.

Oleanolic acid has a low solubility in olive oil and may cause turbidity.

Japanese Patent JP 9078061 (Derwent Abstract) discloses the use of a hydrolysed extract of olives and olive leaves as an antioxidant to be used for food, feed, cosmetics and drugs.

J. of the Am. Oil Chemists Soc. Vol. 73, no.3, pp. 371–374 (1996) gives a description of harvesting olive oil by pressing olive fruits at ambient temperature. For improving the olive oil flavour some olive leaves are added to the process mixture.

It is known that olive oil contains low amounts of oleanolic acid, although its presence is avoided because its low solubility in oil causes turbidity, particularly when the oil is stored below ambient temperature. Another useful component of olive oil is oleuropein, one of the native phenolic compounds which because of its bitter taste is removed from olive oil after pressing by washing or hydrolysis. Presently it is appreciated for its health supporting properties. Oleuropein is believed to have anti-inflammatory and anti-oxidant properties.

In olive oil which is obtained by conventional olive oil processing no levels higher than 300 ppm for oleanolic acid have been reported. Generally, olive oil is prepared by harvesting olive fruits and subjecting these to a malaxation treatment which comprises crushing and kneading the olives so that a mash is obtained containing the whole content of the olive fruit: solid matter, oil and an aqueous phase. Accidentally, some leaves of the olive tree may be encountered in the malaxation mixture. After malaxation the mash is separated into a liquid phase and a solid residue. The olive oil is separated from the aqueous phase in a decanting vessel or by centrifugation. The olive oil may be washed with water.

SUMMARY OF THE INVENTION

We have discovered the fortification of food products with oleanolic acid. The nutritional potential of this compound is based on its many valuable health supporting properties (see EP 94 517). The invention provides an economical and simple process for the fortification of food products with oleanolic acid, in particular of a vegetable oil such as olive oil. According to the present invention an olive oil or olive residue oil is prepared according to a conventional process, but with the exception that the malaxation mash contains 5–50 wt. % of olive leaves the malaxation treatment is carried out at an elevated temperature being 24–60° C.

This adapted process results in an olive oil or an olive residue oil which contains at least 300 ppm of oleanolic acid.

DETAILS OF THE INVENTION

Figure 1:
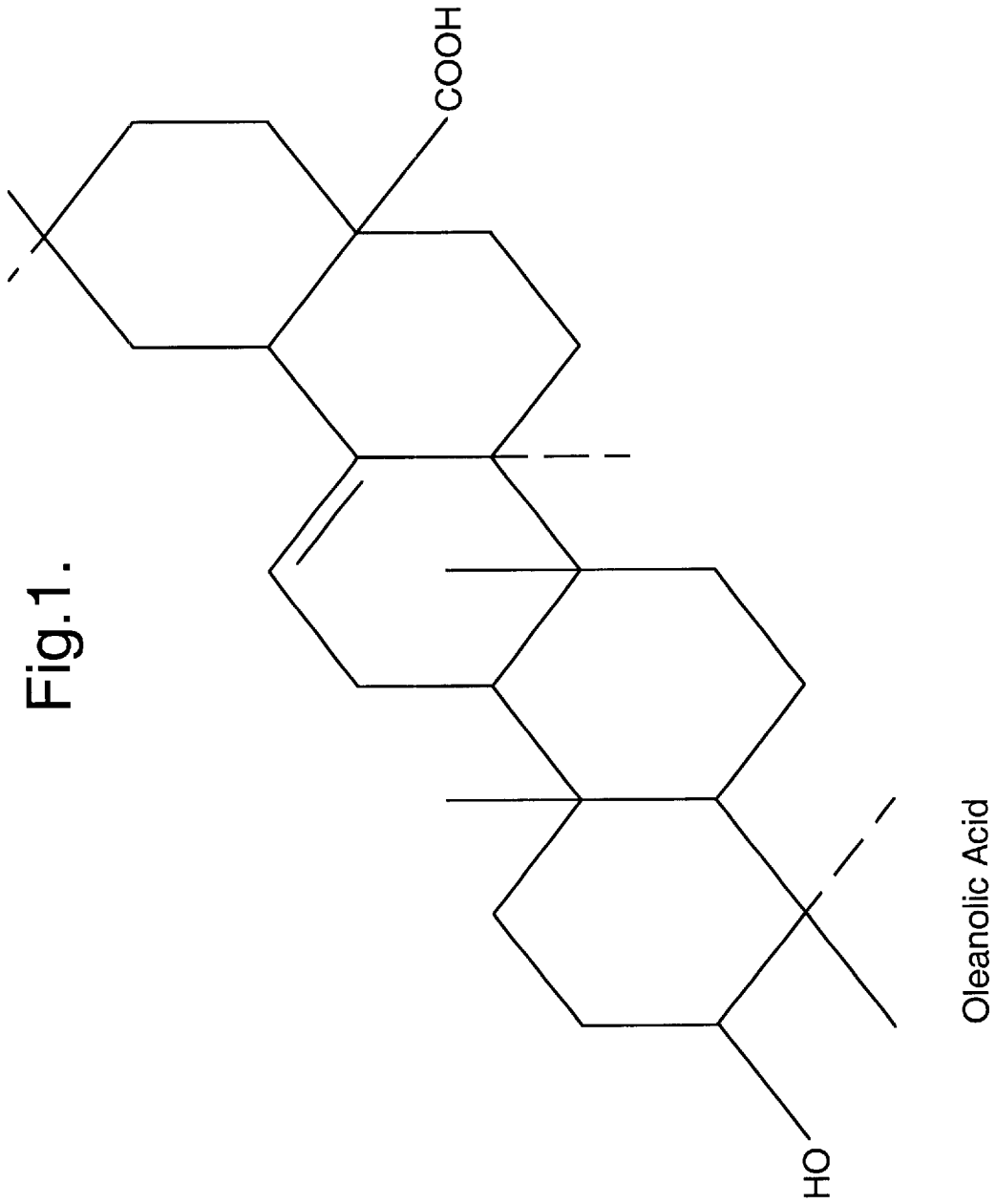
FIG. 1 shows the chemical structure of oleanolic acid.

The present invention relates to a process for preparing an olive oil fortified with oleanolic acid, which comprises the steps of:

subjecting a mixture of olive fruits and olive leaves to a malaxation treatment resulting in a mash which contains a first olive oil and a first residue; and separating the first olive oil from the first residue.

In order to get a substantial amount of oleanolic acid dissolved, the malaxation process has to be carried out at an elevated temperature being 24–60° C., preferably 30–60° C., more preferably 30–40° C.

In the malaxation mixture olive leaves are present in an amount 5–50 wt. %, preferably 10–50 wt. %, based on the weight of the mash.

Since the leaves of the olive are such a rich source of oleanolic acid, the present process results in a substantial fortification of the olive oil. The extent of fortification not only depends on the amount of added leaves and extraction temperature, but also on the type of the olive tree. The content of oleanolic acid in the leaves may vary from year to year. For obtaining a specific content of oleanolic acid in the olive oil, a suitable approach is first to determine the amount of this compound in the olive leaves and then to adjust the amount of olive leaves added to the malaxation mixture.

The process according to the invention may include conventional process steps, such as water washing of olives and leaves. Water may be added before the first olive oil is separated from the first residue. Decantation, centrifugation and filtration are suitable processes for the separation of olive oil from residue and aqueous phase.

According to a further embodiment of the present invention water is added to the first residue and the residue is extracted employing conventional extraction conditions. This process yields a second olive oil and a second residue. The second olive oil is separated from the second residue. The second olive oil also contains a considerable amount of oleanolic acid. Preferably, before extraction extra olive leaves are added to the first residue, preferably, in an amount of 5–50 wt. %, more preferably 10–50 wt. %, based on the total extraction mass.

According to still another embodiment of the invention the olive leaves are not added to the fresh olives but only to the first residue.

Subsequently, one or both residues can be subjected to solvent extraction, applying conventional process conditions, which yields an olive residue oil which is also fortified with oleanolic acid. From the separated mixture of solvent and oil the fortified olive residue oil is obtained by evaporating the solvent. Suitable solvents are hexane and acetone.

TABLE I

| | Oleanolic acid (ppm) |
|---|---|
| Olive oil obtained by conventional process | <300 |
| Olive oil obtained with malaxation at 30° C. in the presence of 50 wt. % of olive leaves | 400 |

According to another embodiment of the invention an oleanolic acid concentrate is prepared starting with the olive oil or olive residue oil obtained with the present invention.

The fortified olive oil or olive residue oil is subjected to an extraction with an oil immiscible solvent which results into a solvent phase containing oleanolic acid and an oil phase. By distilling the solvent from the solvent phase the desired concentrate is obtained. Suitable solvents for oleanolic acid are alcohols, preferably methanol and ethanol and mixtures of an alcohol with water.

The present invention comprises an olive oil or an olive residue oil which contains at least 300 ppm, preferably at least 350 ppm, more preferably at least 450 ppm of oleanolic acid.

The invention further comprises an olive oil or an olive residue oil which contains at least 300 ppm, preferably at least 350 ppm, more preferably at least 450 ppm of oleanolic acid and additionally at least 20 ppm, preferably at least 100 ppm of oleuropein. The oleuropein may be a native component of the oil or it may be added in isolated form.

The effect of high concentrations of oleanolic acid in the obtained oil is the occurrence of turbidity when after processing the oil cools down to ambient temperature. The turbidity is caused by dispersed, not dissolved oleanolic acid. Although turbidity is not acceptable when a clear olive oil is desired, it does not harm when the oil is used as an ingredient for preparing a food product according to the invention.

The olive oil, olive residue oil and concentrate obtained according to the present invention are useful ingredients for the preparation of fortified food products, preferably olive oils, such as extra virgin olive oil, fine, semi-fine or regular virgin olive oil, refined olive oil, or olive residue oil and blends which contain virgin olive oil and refined olive oil.

The oleanolic acid concentrate can be admixed e.g. with other vegetable oils such as rapeseed oil, sunflowerseed oil, soybean oil and corn oil. Common food products such as spreads, mayonnaises, salad dressings and sauces can be fortified by substituting the oil component by an oil according to the invention. Spreads are understood to be products which contain a substantial amount of fat, often 40 wt. % and more, which have a plastic consistency and which are used for buttering bread.

What is claimed is:

1. A process for fortifying olive oil with oleanolic acid, which comprises the steps of:

subjecting harvested olives to a malaxation treatment, where the malaxation mash contains, calculated on mash, 5–50 wt. % of olive leaves and that the malaxation treatment is carried out at 24–60° C., separating the malaxation mash into an olive oil phase denoted as first olive oil, a solid residue denoted as first residue and an aqueous phase, collecting the olive oil, the temperature and amount of olive leaves being chosen for the malaxation such that an oil containing at least 300 ppm of oleanolic acid results.

2. A process according to claim 1, where the malaxation is carried out at 30–60° C.

3. A process according to claim 1, where the mash contains 10–50 wt. % of olive leaves.

4. A process according to claim 1, which comprises the further step of:

extracting the first residue with water resulting in a mixture of a second olive oil and a second residue, separating the second olive oil from the second residue and collecting the second olive oil.

5. A process according to claim 4, wherein the first residue before being extracted with water is mixed with, calculated on total extraction mass, 5–50 wt. % of olive leaves.

6. A process for preparing an olive residue oil fortified with oleanolic acid, which comprises the steps of:

subjecting a residue obtained with a process according to claim 1 to solvent extraction to obtain a mixture of oil, solvent and a final residue, separating the liquid phase from the solid residue phase and removing the solvent by evaporation from the oil to obtain an olive residue oil.

7. A process for preparing a concentrate containing oleanolic acid, which comprises the steps of:

subjecting the oil obtained with a process according to claim 1, to an extraction with an oil immiscible solvent in which oleanolic acid can dissolve to obtain a solvent phase which contains oleanolic acid, evaporating the solvent from the solvent phase and collecting a concentrate containing oleanolic acid.

8. A process for fortifying an olive oil with oleanolic acid, which comprises the steps of:

subjecting a mash of crushed olives which contains olive leaves to a malaxation treatment, separating the mash after malaxation into an olive oil phase denoted as first olive oil, a solid residue denoted as first residue and an aqueous phase, adding olive leaves to the first residue in an amount of 5–50 wt. %, based on the weight of the extraction mass, extracting with water the first residue containing the leaves to obtain a mixture of a second olive oil and a second residue and separating the second olive oil from the second residue, the temperature and amount of olive leaves being chosen for the malaxation such that an oil containing at least 300 ppm of oleanolic acid results.

9. An olive oil which contains at least 300 ppm of oleanolic acid and which additionally contains at least 20 ppm of oleuropein.

10. An olive residue oil which contains at least 300 ppm of oleanolic acid and which additionally contains at least 20 ppm of oleuropein.

11. A food product which comprises at least one member of the group consisting of an olive oil which contains at least 300 ppm of oleanolic acid, an olive residue oil which contains at least 300 ppm of oleanolic acid and a concentrate obtained by subjecting harvested olives to a malaxation treatment, where the malaxation mash contains, calculated on mash, 5–50 wt. % of olive leaves and that the malaxation treatment is carried out at 24–60° C., separating the malaxation mash into an olive oil phase denoted as first olive oil, a solid residue denoted as first residue and an aqueous phase, collecting the olive oil, subjecting the resulting olive oil to an extraction with an oil immiscible solvent in which oleanolic acid can dissolve to obtain a solvent phase which contains oleanolic acid, evaporating the solvent from the solvent phase and collecting a concentrate containing oleanolic acid.

12. A food product according to claim 11, which is a vegetable oil.

13. A food product according to claim 12 which is an olive oil.

14. A food product according to claim 11, which is chosen from the group consisting of spread, mayonnaise, salad dressing or tomato sauce.

* * * * *